May 11, 1937.  O. J. CROWE  2,080,166
BEAD MOLDING
Filed March 3, 1934
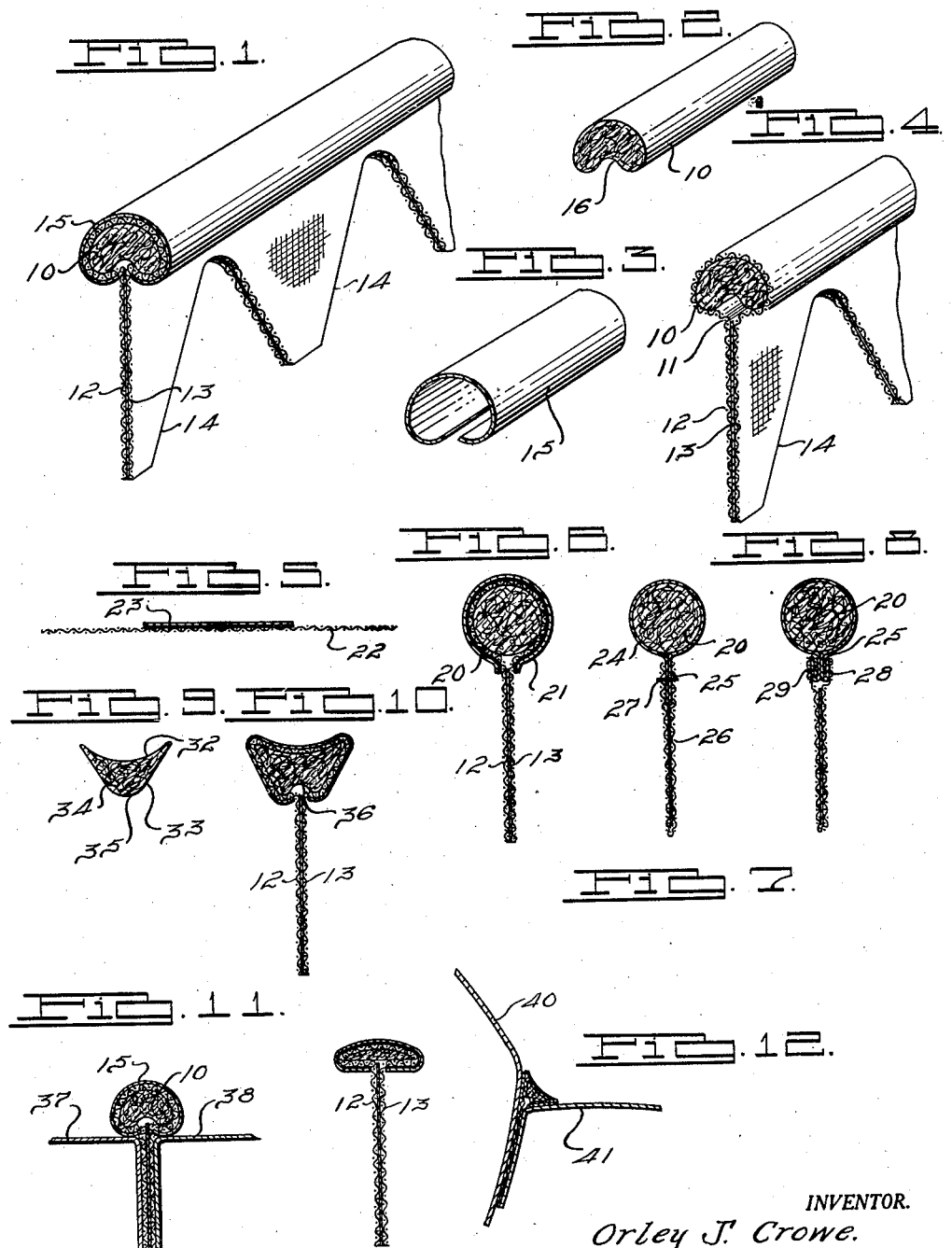
INVENTOR.
Orley J. Crowe.
BY
Harness, Dickey, Pierce & Hann.
ATTORNEYS.

Patented May 11, 1937

2,080,166

UNITED STATES PATENT OFFICE 2,080,166

BEAD MOLDING

Orley J. Crowe, Detroit, Mich.

Application March 3, 1934, Serial No. 713,828

8 Claims. (Cl. 280—152)

The invention relates to moldings particularly having a bead along one edge and which may be used between parts of automobile bodies, refrigerators, or the like, for concealing junction lines or exposed edges, and additionally which may be used as an anti-squeak filler strip.

One object of the invention is to provide an improved bead molding having a metal covered bead which may be readily bent or flexed so that it may be extended around irregular or curved edges by the operator applying it without injuring the appearance of the bead.

Another object of the invention is to provide a bead molding of this character which may also be used as an anti-squeak filler strip between adjacent and substantially abutting members.

Another object of the invention is to provide a bead molding which is so shaped that it will fit in with the streamlining design of an automobile body, for example, at the junction line of two parts of the body.

Another object of the invention is to provide a method of manufacturing a bead molding wherein a filler is covered by a thin metallic covering.

Other objects of the invention will become apparent from the following description, the drawing relating thereto and from the claims hereinafter set forth.

For a better understanding of the invention, reference may be had to the drawing, wherein:

Figure 1 is a fragmentary and perspective view of a bead molding constructed according to one form of the invention.

Fig. 2 illustrates the separated filler for the molding shown by Fig. 1.

Fig. 3 illustrates the separated metallic covering for the molding.

Fig. 4 illustrates the filler initially covered by fabric or the like prior to applying the metal covering shown by Fig. 3.

Figs. 5 and 6 illustrate another form of the molding and the material and method used in manufacturing it.

Figs. 7 and 8 illustrate bead molding constructed according to other forms of the invention.

Figs. 9 and 10 illustrate different forms of filler strips that may be used to vary the shape of the bead of the molding so as to accommodate the bead for use in different locations.

Fig. 11 illustrates application of a bead molding constructed according to one form of the invention, between a pair of panel members.

Fig. 12 illustrates application of the bead molding between adjacent members on an automobile body for continuing a predetermined contour or streamlining effect.

Fig. 13 illustrates a bead molding constructed according to the invention and which may be of substantially T-shape.

Referring to Figs. 1 to 4, inclusive, the molding illustrated comprises a filler 10 constructed of paper, leather or the like, and this filler is enclosed by a strip of fabric 11 which has lapping leg portions 12 and 13 that may be secured together such as by cementing as shown, or in other ways such as by sewing. These leg portions have notches as indicated at 14 which are substantially of inverted V-shape with the apex portion of the notches extending substantially to the filler. The fabric covered filler is covered by a thin metal member 15 which is folded around the bead and under the lower edges thereof substantially to the leg portions 12 and 13. A groove 16 is formed in the lower surface of the filler and in applying the metal strip 15 the adjacent edges of the latter are crimped upwardly into the groove thereby also crimping the fabric into the groove.

It will be appreciated that the notches in the fabric legs 12 and 13 readily facilitate flexing of this part of the molding in different directions so that it may be applied around irregular or curved edges and in other locations that will be appreciated by those employing the molding. The metal covering 15 is thin and can be readily bent within recognized limits without detracting from its appearance. Provision of the inturned edges of the metal covering and crimping them into the groove 16 not only brings these edges close together but provides a structure which will prevent spreading of the edges in a lateral direction when the bead is flexed in different directions. It will be appreciated that if the edges of the metal covering were terminated, for example, at points barely under the lower edges of the filler and the molding were bent upwardly, the edges of the metal covering would naturally expand and this would be readily visible. This is avoided in the construction illustrated by turning the edges of the metal covering inwardly until they are close together and also turning them into the groove 16 so as to provide a rigidity and strength that will normally prevent laterally opening of the slot between the edges.

In the construction shown by Figs. 5 and 6, a filler 20 is illustrated which is covered by fabric such as shown by Fig. 4 and around the bead portion of the fabric a thin metal covering 21 is employed. In manufacturing this construction, a layer of fabric 22 initially is provided as shown by Fig. 5 which is covered by a very thin and flexible layer of metal 23 normally thinner than the fabric and which preferably is cemented thereto although it might be secured thereto as by sewing or the like. At laterally opposite edges of the metal 23 the legs of the fabric are extended and are notched as shown by Fig. 1 and then this assembly is folded around the filler 20 and the side portions of the fabric constituting the legs are cemented or secured together as previously mentioned. Owing to the fact that the metal 23 is very thin, for example 5/1000 of an inch in thickness, and flexible and that it is secured to the fabric extending around the filler 20, it will be readily appreciated that the bead portion of this molding can be bent to various shapes without injuring the molding and without noticeably detracting from its appearance. Various metals may be employed in this construction such as zinc, brass, or the like, as will readily lend themselves to fabrication so as to obtain a thin layer that may be flexed very readily and which may be painted or plated with chromium or the like if desired.

In the construction shown by Fig. 7 the filler also indicated at 20 is covered by metal 24 and the edges of the metal are disposed in lapping relation so as to provide a short leg 25. The fabric leg comprises a folded piece of fabric 26 having folded portions and its free edges lapping over the metal leg 25 and stitched or otherwise secured thereto as indicated at 27. The metal covering 24 is thin so as to readily enable stitching or otherwise securing the fabric to the leg 25 and also to facilitate bending the bead as previously considered. The fabric leg will be provided with notches as previously mentioned to facilitate its manipulation when it is necessary to bend the molding.

In the construction shown by Fig. 8, the metal covering, which may be like that shown by Fig. 7, has reversely folded edges 28 and 29 on the leg portion 25 and the edges of the fabric are directed between the body of the leg and the reversely directed edges and are clinched or clamped therebetween. In other respects the fabric leg may be like that shown by Fig. 7.

Figs. 9 and 10 illustrate different shapes of beads and fillers therefor for use in different locations. Fig. 9 shows a filler substantially of triangular shape and having a dished or curved recess in its upper face, as indicated at 32, and having tapering sides 33 and 34 which are joined by a rounded apex 35. The filler as shown by Fig. 10 is similar to that shown by Fig. 9 excepting that it is provided with a groove 36 for clinching the metal of the metal covering thereinto similarly to the manner in which the metal is clinched into the groove 16 shown by Fig. 1.

Fig. 11 shows an application of any of the bead moldings between panels 37 and 38 and in this construction the fabric leg may act as a sealing means or anti-squeak strip if necessary. Primarily, the bead portion of the molding is used as a means for concealing the joint between the panels so that a neat junction line will be obtained.

In the construction shown by Fig. 12 the part 40 may constitute the dropping surface of the roof in a stream-lined automobile and the part 41 may be the top of a trunk or the like on the end of the automobile. In cases of this character the use of a bead molding having a shape such as shown by Figs. 9 and 10 readily lends itself to continuing the streamline contour of the body part 40 so that it will merge more desirably into the top surface of the trunk 41. It will readily be appreciated that the abrupt junction line that would otherwise exist is avoided by using the bead molding in this case, it being understood, of course, that the fabric leg may project downwardly between the parts and is held therein.

Fig. 13 illustrates a bead molding that may be constructed similarly to any of the others wherein the metal bead and filler therein are substantially flat so as to obtain in conjunction with the layers 12 and 13, a molding of substantially T-shape.

Under certain circumstances, instead of using a fiber or paper filler covered with fabric, an extruded or molded rubber filler and leg combined could be used. In this case the metal bead portion is applied around the bead portion of the rubber.

Any of the bead moldings illustrated and described can readily be bent and deflected so as to follow irregular or curved junction lines, door edges or the edges of various constructions so as to conceal the edges or junction lines and add to the appearance of the structure. The moldings may be used on automobiles, refrigerators, furniture, lamp shades, window display edging and in various industries where a bead molding along an edge would be found desirable. The fact that the molding can be so easily bent or deflected in all directions makes it much more economical to use this type of molding as compared to other moldings that have been previously manufactured. The molding may serve a two-fold purpose in that the leg may be used between panels to avoid squeaking and to obtain a seal and, second, that the metallic bead which may be either plain, painted or plated with various metal platings, may serve as a bead around the edge of a structure upon which it may be used.

Although more than one form of the invention has been illustrated and described in detail, it will be apparent to those skilled in the art that various modifications may be made without departing from the scope of the appended claims.

I claim:

1. A bead molding comprising a bead filler, flexible material folded around the filler and projecting therefrom to form a leg, and a thin metal layer covering the bead portion of the flexible material and having its edges terminating adjacent the leg and one edge reversely turned toward the filler.

2. A bead molding comprising a bead filler, flexible material folded around the filler and projecting therefrom to form a leg, and a thin metal layer covering the bead portion of the flexible material and having its edges terminating adjacent the leg and reversely turned toward the filler.

3. A bead molding comprising a filler having a groove in one side, a flexible layer covering the filler and having a leg directed from a point adjacent the groove, and a hard finish layer covering the flexible layer and having edges directed into and also directing the flexible material into the groove.

4. A bead molding comprising a flexible strip, means forming a bead at one edge of the strip, a thin metal cover for the bead and having its edges terminating adjacent opposite sides of the strip, and means on such edges for preventing separation of the edges and enlarging of the space between them when the bead is bent in the plane of the strip.

5. A bead molding comprising a flexible strip, means forming a bead at one edge of the strip, a thin metal cover for the bead and having its edges terminating adjacent opposite sides of the strip, and means on such edges for preventing separation of the edges and enlarging of the space between them when the bead is bent in the plane of the strip, said means comprising curved and inturned portions at such edges which are directed towards the center of the bead.

6. A bead molding comprising a flexible strip having a bead along one edge, a thin metal layer covering said bead and terminating at opposite sides of the strip in edges reinforced by being reversely bent upon themselves to resist spreading when the bead is bent.

7. A bead molding comprising a flexible strip having a bead along one edge, a thin metal layer covering said bead and terminating at opposite sides of the strip in edges reinforced by being bent towards the inside of said layer to resist spreading when the bead is bent.

8. A bead molding comprising a flexible bead filler, flexible material folding around the filler, and projecting therefrom to form a leg, a thin metal strip covering the head portion and terminating at the opposite sides of said leg portion in edges reinforced by being reversely bent upon themselves to resist spreading when the bead is bent.

ORLEY J. CROWE.